Patented June 2, 1931

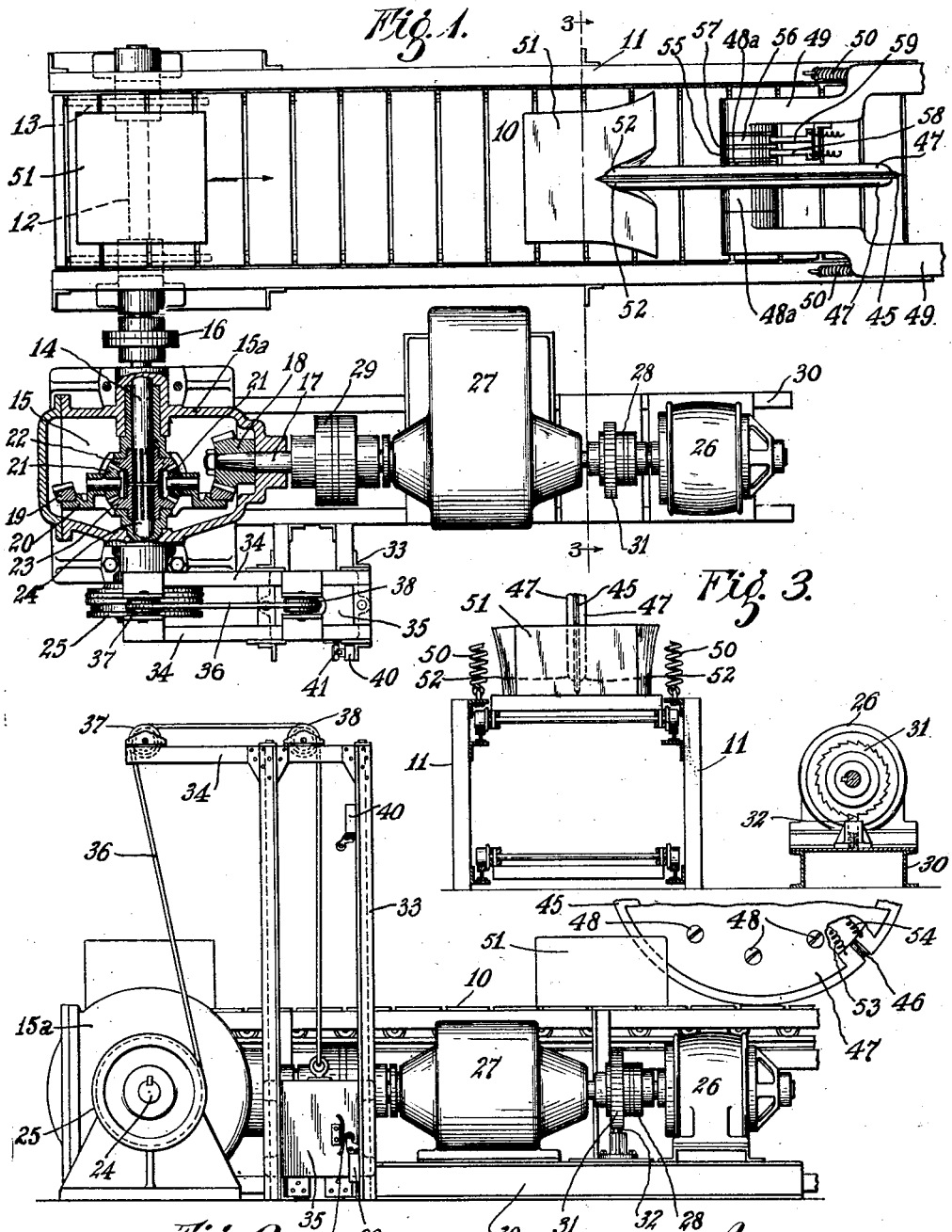

1,808,563

UNITED STATES PATENT OFFICE

ROBERT MAYNE, OF AKRON, OHIO, ASSIGNOR TO THE B. F. GOODRICH COMPANY, OF NEW YORK, N. Y., A CORPORATION OF NEW YORK

LOAD-LIMITING METHOD AND APPARATUS

Application filed October 9, 1928. Serial No. 311,406.

The invention relates to methods and apparatus for limiting the load imposed upon a driving device by the driven mechanism; and my general object is to provide improved procedure and apparatus for that purpose.

Among the more specific objects are to provide in an improved manner for stopping a driving device in the event of an overload applied thereto, and for thereafter restarting the same when the overload has been removed or sufficiently reduced; and to provide in an improved manner for modifying the form of a mass of material while conveying it along a determinate path and changing its form as an incident of its movement along the said path.

My invention, although not limited thereto, is of especial value in certain conveyors because of the frequency with which overloading of the conveyor-driving mechanism occurs, when suitable precaution against it is not taken, as the result of accidental jamming or locking of certain of the conveyor parts or of articles being carried thereupon or as the result of the variable and frequently excessive loading of the conveyor.

It is of especial value in connection with conveyors also because of the fact that the conditions creating the overload in the conveyor frequently occur at a considerable distance from the manual controls of the driving mechanism, which makes it desirable to have a control device adapted for automatic restarting of the drive mechanism in consequence of the mere removal of the cause of overload, such as the rearrangement of jammed articles, without necessitating travel of the operator such as would be necessary for this operation of the manual controls.

My invention also has a high degree of utility in connection with certain conveyors which not only serve to feed material to a station at which work is to be performed upon the material, but also serve to feed the material along at the work station against the varying resistance of the work-performing means thereat.

This utility of the invention is clearly illustrated in connection with the cutting of slabs of plastic material such as crude rubber by means of a hot knife or the like, wherein the material is conveyed to the knife preferably at a relatively high rate of speed, and wherein the resistance offered by the knife to the movement of the slab in contact therewith is variable and is highly dependent upon the speed at which the slab is forced past it. My invention provides for stopping the high speed drive and substituting therefor a determinate driving force independent of the speed for driving the conveyor at a relatively slow speed when the resistance of the knife to the continued forward movement of the slab and conveyor reaches a determinate maximum, and it also provides for the renewed application of the high speed drive for driving the conveyor during the intervals between the successive cutting operations.

Of the accompanying drawings:

Fig. 1 is a plan view, partly in section, of my improved drive-control apparatus associated with an endless conveyor and a rotary cutter.

Fig. 2 is a side elevation of the said apparatus, showing the means for controlling the driving means.

Fig. 3 is a vertical section on line 3—3 of Fig. 1.

Referring to the drawings, the apparatus shown comprises an endless conveyor 10 the upper and lower reaches of which are carried in a well-known manner on a framework 11. The conveyor is driven by power applied through shaft 12 and sprockets or the like 13. One of the driven shafts 14 of a differential-gear mechanism 15 of usual construction is connected to one end of the shaft 12 by a coupling 16 or by other suitable means.

The differential-gear mechanism 15 comprises a casing 15ª which houses a drive shaft 17 carrying a drive shaft pinion 18 meshed with a ring gear 19 mounted upon a spider or cage 20. The latter carries a plurality of differential pinions 21, 21 each meshed with differential gears 22, 23 which are splined respectively upon the shaft 14 and upon a coaxial shaft 24 which extends through the opposite side of the casing 15ª. A grooved pulley 25 is mounted upon the end of the shaft 24 outside said casing.

A motor 26 is connected to the drive shaft 17 through the reduction gear device 27 and couplings 28 and 29. The motor 26, reduction gear device 27 and differential-gear mechanism 15 are suitably aligned and carried upon a suitable framework 30 parallel to the framework 11. Mounted upon the shaft between the motor 26 and reduction gear 27 is a ratchet 31 which is engaged by a spring-pressed pawl 32 mounted on the framework 30, the arrangement being such as to limit the rotation of the motor armature to one direction.

Rising from the framework 30 at one side thereof is a framework 33 extending vertically a substantial distance above the general horizontal plane of the motor and differential assembly, the top of said framework 33 being provided with a pair of overhanging arms 34, 34 extending above the pulley 25 of the differential mechanism 15. The framework 33 provides guideways for a weight 35, and a cable 36 is attached at one of its ends to said weight and at its other end to the pulley 25, the intermediate portion of the cable riding in sheaves 37, 38 journaled on the overhanging arms 34.

The length of the cable 36 is such that the weight 35 normally rests in its lowermost position in the supporting framework 33 when there is no overload on the driving mechanism, the weight 35 being sufficiently heavy to withstand the normal driving torque in the driven shafts and, after being lifted in consequence of high resistance to the conveyor's movement, to drive the conveyor 10 slowly in the same direction as it is normally driven by the motor 26. The mass of the weight determines the maximum torque that can be transmitted to shaft 14 by the driving means, so that by varying the mass of the weight, the extent of the overload required to stop the motor can be varied.

For stopping the motor when an overload occurs, and for starting it again when the overload is removed, a stop switch 40 is mounted upon the same framework near the top thereof and a starting switch 39 is mounted upon the framework 33 near the bottom thereof. The switches are provided with control arms which extend into the path of an actuating shoe 41 mounted upon one face of the weight 35, the arrangement being such that the motor 26 is adapted to be power-driven when the weight is in its lowermost position, but will be shut off from its source of driving power when the weight is in its uppermost position.

For cutting successive slabs of plastic material such as crude rubber as the spaced slabs move along the conveyor 10 I provide a vertically-arranged, substantially-circular, electrically-heated knife 45, preferably of nichrome steel or other resistant material, positioned upon the work-carrying reach of the conveyor and adapted to rotate on a horizontal axis transverse to the conveyor. The knife is of annular form and is formed with a gap at one part of its circumference, its ends at the gap being spaced apart by an insulating member 46. The knife 45 is mounted between and suitably insulated from circular metal plates 47, 47, to which it is secured by screws 48, 48, the knife extending outwardly from between the circumferential margins of the said circular plates. Each of the plates 47 has a central hub portion 48ª and the plate and knife assembly is journaled upon a pair of bracket arms 49, 49. The respective bracket arms 49, 49 are pivotally secured to the framework 11 at opposite sides of the conveyor for limited vertical movement.

Hold-down springs 50, 50 connect the respective bracket arms 49, 49 with the frame members 11, 11 in such manner as to hold the knife 45 in driving contact with the adjacent tread or slab-carrying members of the conveyor 10, which preferably are made of wood, the knife thus being adapted to operate upon a slab 51 of crude rubber or the like moving along on the conveyor 10.

The circular plates 47, 47 are transversely rounded at their perpheries to provide shouldered portions 52, 52 adjacent the knife 45, these shouldered portions assisting to force apart the cut sides of the slab as the latter moves past the knife, so as to prevent any binding of the material against the latter and to avoid any interference with its operation.

For heating the knife 45 a pair of insulated wires 53, 54, connect the respective ends of the knife with a suitable source of electric power through brushes 58, 59 running on respective spaced-apart rings 55, 56 of conducting metal mounted on a hub portion of one of the plates 47 and having a ring or plate 57 of insulating material arranged between them.

In the operation of the apparatus the conveyor 10 is driven, in the direction indicated by the arrow in Fig. 1, by the motor 26 acting through the reduction gear device 27, differential-gear mechanism 15, shafts 14, 12, and sprockets 13. During the normal operation of the apparatus without overload, the weight 35 is at its lowermost position in the framework 33 and the pulley shaft 24 is held staitonary by the weight.

In the event that the conveyor 10 is overloaded to a determinate extent dependent upon the force of the weight 35 the shaft 14 slows down or stops and the shaft 24 is caused to rotate in the direction to wrap the cable 36 about the pulley 25 and thereupon to raise the weight 35 in its vertical guides.

If the overloaded condition of the conveyor continues until the weight 35 reaches its uppermost position, the actuating shoe 41 on the weight will engage and depress the control arm of the stop switch 40 and stop the motor, but, if the resistance is such as to become less as the speed decreases, as in the case of one of the slabs of rubber 51 engaging the hot knife 45, the conveyor 10 will continue to be driven in the same direction through the shafts 24 and 14 by the driving force exerted thereupon by the weight 35.

As the weight 35 reaches its lowermost position, the shoe 41 engages the switch 39 and closes an electric circuit which starts motor 26, which then again lifts the weight for a repetition of the cycle if the resistance of the conveyor is still great enough, at the motor speed, to dominate over the force of the weight, but otherwise simply drives the conveyor with the weight remaining stationary, as first described. The length of the vertical path of the weight may be sufficiently short that the conveyor will not race in the event that the load is suddenly removed therefrom when the weight is at the uppermost point in its path. Thus in operating the apparatus to convey and cut the rubber slabs the conveyor 10 is driven at a relatively high rate of speed by the motor when no material is contacting with the hot knife, the successive slabs of material being spaced apart on the conveyor longitudinally thereof, the spacing preferably being such that no part of any slab is brought into contact with the insulating member 46 which connects the ends of the knife.

As a slab of the material moving along on the conveyor comes in contact with the knife 45 continued forward movement of the conveyor is resisted by the force of the knife upon the slab and the conveyor slows up, the weight being lifted when the resistance reaches a determinate amount. The conveyor then continues to be subjected to the determinate driving force of the weight, independently of the speed, and thus the hot knife is allowed time to function by softening of the rubber as well as by its force against the slab, severing the slab into two portions, which proceed upon the conveyor, the conveyor speeding up under the driving force of the weight as soon as the cutting operation is completed and the motor automatically being substituted for the weight as the driving means when the descending weight actuates the starting switch 39.

The employment of the differential gearing, in which the driving force is applied to the load through leverage of the third order, in the pinions 21, with the normally stationary gear 23 as the fulcrum, provides a simple and convenient arrangement for establishing a determinate statical force, such as that of the weight 35, as the limit of the driving force to be applied to the conveyor.

By the use of my method and apparatus I am able to effect the various objects of my invention, and prevent injury to the driving mechanism resulting from the overloading thereof, while employing for the purpose apparatus that is simple in construction, readily assembled, and positive and automatic in operation.

My invention may be modified within the scope of the appended claims.

I claim:

1. The method of limiting the load imposed upon a driving mechanism by a driven mechanism which comprises interposing in a system of forces including the force of the driving mechanism and the resistance of the driven mechanism, a normally statical resistance of such magnitude as to be overcome by the force of the driving mechanism when the resistance of the driven mechanism attains a determinate magnitude, the said statical resistance being so interposed in the system as to fulcrum the force of the driving mechanism for driving the driven mechanism by leverage of the third order.

2. The method of limiting the load imposed upon a driving mechanism by a driven mechanism which comprises interposing in a system of forces including the force of the driving mechanism and the resistance of the driven mechanism a statical and ordinarily non-yielding resistance of determinate magnitude so that the said resistance of the driven mechanism upon attaining a determinate magnitude will cause the force of the driving mechanism to overcome the said statical resistance, and thereafter applying a part of the force of the driving mechanism to effect protection of the driving mechanism against additional resistance of the driven mechanism.

3. A method as defined in claim 2 in which the statical resistance is so interposed in the system as to fulcrum the force of the driving mechanism for driving of the driven mechanism by leverage of the third order.

4. A method as defined in claim 2 in which potential energy is established by the overcoming of the statical resistance and is subsequently applied to effect a re-establishing of the original relation of the driving mechanism to the driven mechanism.

5. The method of modifying the form of a mass of material which comprises conveying the mass along a determinate path and as an incident of its movement along the said path changing its form by the application of forces which increase the resistance to its forward movement and dependent in their magnitude upon the speed of the mass, the mass being urged forward during the form-modifying operation by a determinately limited force which in magnitude is substantially independent of the speed of the mass.

6. In a driven mechanism and a driving mechanism therefor, the combination of a driving member and a member driven thereby and power-transmitting mechanism interconnecting the two said members and comprising a normally statical member and means for normally holding it in a statical condition but of such resistance as to be overcome by a determinate driving force, the statical member being so positioned with respect to the driving member and the driven member as normally to fulcrum the force of the driving member with respect to the driven mechanism by leverage of the third order.

7. In a driven mechanism and a driving mechanism therefor, the combination of a driving member, a member driven thereby, and power-transmitting mechanism interconnecting the two said members and comprising a normally statical member and yielding means for normaly holding it in a statical condition but of such determinately small resistance as to be overcome by a determinate driving force, and means responsive to movement of the said normally statical member for protecting the said driving member against overload.

8. Apparatus as defined in claim 7 in which the statical member is so positioned with respect to the driving member and the driven member as normally to fulcrum the force of the driving member with respect to the driven mechanism by leverage of the third order.

9. Apparatus as defined in claim 7 including means associated with the yielding means for automatically re-establishing the original relation of the driving mechanism to the driven mechanism upon return movement of the yielding means.

10. In apparatus comprising a driven mechanism and a driving mechanism therefor, the combination of a driving member, a pair of driven members adapted to be driven thereby, means operatively so connecting said pair of driven members with the driving mechanism as to cause the latter to drive them alternately upon the differential principle, yielding means opposed to the actuation of one of the said driven members by the said driving member, means limiting the movement of said yielding means in opposition to the driving force of the said driving member thereon, and means, operative upon the overcoming of the yielding means by the force of the driving member for preventing excessive strain in the latter.

11. In apparatus comprising a conveyor and a driving mechanism therefor, the combination of a conveyor, a driving member therefor, a normally non-yielding statical member capable of being put into motion by a determinate driving force and automatic means interconnecting the said conveyor, the driving mechanism, and the normally statical member whereby the last-named member is moved to the effect protection of the driving mechanism when the resistance developed in the said conveyor reaches a determinate magnitude.

12. In apparatus comprising a driven mechanism and a driving mechanism therefor, the combination of a driving member, a pair of driven members, means operatively so connecting the said driven members with the driving mechanism as to cause the latter to drive them alternatively upon the differential principle, a conveyor driven by one of the said driven members, yielding means opposed to the actuation of the other of said driven members by the said driving member, means limiting the movement of the said yielding means in opposition to the force of the said drive member thereon, and means operative upon the overcoming of the yielding means by the force of the drive member for preventing excessive strain in the driving member.

13. In apparatus comprising a driven mechanism and a driving mechanism therefor, the combination of a driving member, a pair of driven members so connected operatively with said driving member as to be driven thereby upon the differential principle, means adapted to drive one of the said pair of driven members in a direction opposite to the direction of the force applied thereto by the first-mentioned driving member, and means associated with the said first-mentioned driving member for preventing reverse movement thereof under the action of the second named driving means.

14. Apparatus for modifying the form of a mass of material, the said apparatus comprising a conveyor, a form-modifying device in the path of the mass of material on the conveyor, means for driving the conveyor to bring the mass of material into association with the said form-modifying device, said driving means being responsive to the increased resistance incident to such association to permit a lessening of the speed of the said mass, and a secondary driving means automatically operative upon the occurrence of such lessening of speed to urge the mass past the said device with a determinately limited force.

In witness whereof I have hereunto set my hand this 28th day of Sept., 1928.

ROBERT MAYNE.